3,481,257
EPOXY RESIN-WALNUT SHELL AGGREGATE
WEAR RESISTANT FLOOR TOPPINGS
David Alan Shimp and William Sheppard Bobo, Jr.,
Louisville, Ky., assignors to Celanese Coatings
Company, New York, N.Y., a corporation of
Delaware
No Drawing. Filed Sept. 26, 1966, Ser. No. 581,769
Int. Cl. E04f 15/12; C08h 17/14
U.S. Cl. 94—3                                    10 Claims

ABSTRACT OF THE DISCLOSURE

A protective floor topping composition resistant to wear from steel wheeled vehicles when cured, which is a curable blend of (a) an epoxy resin, (b) an epoxy resin curing agent, and (c) walnut shell aggregate.

---

This invention relates to a method for improving the wear resistance of floors which are subjected to heavy compressive loads. In another aspect, this invention pertains to industrial floors which are resistant to wear from the traffic of heavily loaded steel-wheeled vehicles.

In industrial plants where floors are constantly subjected to high loading and abrasion, maintenance of the floors presents serious problems. In some automobile plants, for instance, the trucks which are used to transport parts to and from the assembly lines have steel wheels. Concrete floors cannot withstand the constant wear and abrasion from these wheels. The surface of the concrete floor cracks and breaks away leaving pits and holes in the floor. Such floors, in order to remain usable, require constant repair.

In the past, badly chipped, cracked and broken concrete floors have been repaired by removing the old concrete down to a depth of about 2 to 4 inches or more and repouring the floor with concrete. This method of repair required considerable expense in time and labor while producing a floor which had no more wear resistance than the original floor.

More recently, floor topping compositions have been developed which improved the wear resistance of the floors. Such compositions are made with an epoxy resin and curing agent binder blended with sand and other siliceous materials, or iron and other metal particles. Epoxy resin compositions have excellent adhesion to concrete and other surfaces, and these resins in combination with the fillers as described above give hard, tough surfaces. Such compositions can be applied to new unused floors or they can be used to patch and repair old worn floors. Although floors of improved wear resistance are produced, the floors break down in a relatively short time when subjected to heavily loaded steel-wheeled vehicles. The hard fillers appear to cut and abrade the binder under repeated compressive deflections causing the toppings to crack, chip and break away from the flooring surface.

It has now been found that superior floor topping compositions can be made with walnut shell filled epoxy resin systems. Floors coated with walnut shells and epoxy resins withstand the wear from the traffic of heavily loaded carts, trucks and other transport vehicles. Walnut shell filled, trowelable epoxy floor toppings are about one hundred times more resistant to wear from the passage of heavily loaded steel-wheeled vehicles than the untopped concrete floor or floors coated with conventional cementitious floor toppings. They are about ten times more durable than conventional sand-filled epoxy coatings and epoxy coatings filled with expanded or ceramic coated silica. The superior floor topping compositions are made from a curable epoxy resin binder in combination with 20 to 90 weight percent, based on the total composition, of walnut shell particles no finer than 325 mesh nor coarser than ⅛ inch in size.

The epoxy resins useful in preparing the floor topping compositions are glycidyl polyethers of polyhydric phenols and polyhydric alcohols. Such compositions are the reaction products of polyhydric phenols and polyhydric alcohols with epichlorohydrin. Among the polyhydric phenols and polyhydric alcohols from which these epoxy resins are made are p,p'-dihydroxydiphenyl propane or Bisphenol A as it is commonly called, dihydroxydiphenyl methane, dihydroxydiphenyl, dihydroxydiphenyl sulfone, resorcinol, hydroquinone, dihydroxynaphthalene, novolak resins made from a phenol and an aldehyde, ethylene glycol, propylene glycol, butylene glycol, glycerine, trimethylol ethane, trimethylol propane, i.e., compounds which contain at least two phenolic hydroxyl groups or at least two alcoholic hydroxyl groups per molecule. The preferred epoxy resins are those made from epichlorohydrin and Bisphenol A, having an epoxide equivalent weight of about 170 to about 350 and preferably about 180 to about 250.

Viscosity reducers and flexibilizers can also be used in admixture with the epoxy resins. Examples of these are monoglycidyl ethers of phenols and alcohols, such as butyl glycidyl ether, phenyl glycidyl ether, cresyl glycidyl ether and the like. Other modifiers are glycidyl esters of monocarboxylic acids, i.e., glycidyl acetate, glycidyl ester of versatic acid, etc., glycidyl esters of polybasic acids, i.e., azelaic acid, terephthalic acid, dimerized fatty acids, etc., as well as glycidyl ethers of castor oil. The preferred compositions are those which contain less than 50 weight percent modifier in the total epoxy resin mixture.

Useful epoxy resin curing agents are those which will cure the topping compositions within a temperature range of about 0° F. to about 150° F. and preferably from about 32° F. to about 100° F. Suitable curing agents are aliphatic amines, acid accelerated aromatic amines and mercaptans. The aliphatic amines include primary and secondary amine compounds which contain at least two amine nitrogens, each attached to different aliphatic carbon atoms and having a total of more than two active hydrogen atoms attached to the nitrogen atoms. Examples of aliphatic amines are ethylene diamine, diethylene triamine, triethylene tetramine, tetraethylene pentamine, and other polyalkylene polyamines. Also included as aliphatic amines are amine adducts, such as the reaction products of ammonia and polyamines with mono- and polyepoxides as described in U.S. Patents 2,651,589 and 2,921,050. Other aliphatic amine compositions are polyamido amines which are prepared by reacting polymeric fatty acids, such as the so-called dimer acids, with an excess of polyalkylene polyamine as well as the reaction products of mono fatty acids with polyalkylene polyamines. Additional aliphatic amine curing agents useful in this invention are the aliphatic amines as hereinbefore disclosed which are accelerated with phenolic compounds, such as resorcinol, Bisphenol A and the like.

Aromatic amines which are acid catalyzed are also useful in this invention. Examples of such curing agents are metaphenylene diamine or methylene dianiline containing catalytic quantities of salicylic acid or lactic acid.

Mercaptan curing agents are those compounds which contain at least two active mercapto groups. Examples of suitable mercaptans are 2,2'-dimercaptodiethyl ether, 2,2'-dimercaptodipropyl ether, propanedithiol-1,2, ethanedithiol-1,2, butanedithiol-1,3, and adducts of these compounds with epoxy resins.

These and other useful epoxy resins and epoxy resin curing agents are described in "Epoxy Resins," by Lee and Neville, McGraw-Hill Book Company, Inc., (1957). The epoxy resin and epoxy resin curing agents are generally used in such proportions that 0.5 to 1.5 active hydrogen atoms are present for each epoxide group.

The nut shell aggregate used in the floor toppings of this invention are ground-up walnut shells. The preparation of aggregate of this type is described in U.S. Patent 2,507,465. English walnut shells are preferred although black walnut and other nut shells can be used. Particularly useful aggregate filler has a particle size distribution of about 0.125 inch to about 0.0017 inch diameter. Expressed in U.S. Standard Sieve sizes, the particles range from about 6 to 325 mesh. The preferred sizes are from about 0.093 inch to about 0.029 inch (8 to 100 mesh).

Improved topping compositions are made using 20 weight percent up to about 90 weight percent nut shell aggregate in the total mix of binder and filler. The amount of aggregate used will vary somewhat depending upon the particle size distribution of the aggregate, the narrower the distribution the less aggregate that is used. Sufficient epoxy resin binder is used to wet the aggregate particles and to form a continuous coating when trowelled. Excellent results have been obtained using walnut shell aggregate having a particle size of 0.093 inch to 0.0029 inch (8 to 100 mesh) in an amount of about 50 to about 80 weight percent based on the total weight of the topping composition.

Small amounts of thixotropic agents, coloring agents, inert plasticizers and solvents can be incorporated into the compositions where desired.

In carrying out this invention, the epoxy resin, the curing agent and the walnut shell aggregate are blended together until a homogeneous mixture is obtained. This blend is then trowelled over a prepared surface until a smooth even coating is obtained. The surface to be coated should be clean and free of dirt, grit, grease, loose concrete or old topping. It is preferable to prime the surface with an unfilled epoxy resin-curing agent composition although such priming is not absolutely necessary.

The following example describes in detail the application of a topping of this invention to a worn concrete floor. Parts, where used, unless otherwise described, are parts by weight. The epoxy resins, converters and fillers used in the following examples are identified in Table I.

EXAMPLE I

The surface of a worn concrete floor was prepared for resurfacing by removing old topping and cracked concrete with hand held electric hammers equipped with chisel-shaped steel tips. The area was then scarified with a scarifier which contained revolving tungsten carbide tips, followed by scrubbing with water and brooms. A vacuum device was used to remove the excess water and the area was allowed to dry for two hours.

A primer of the following composition was brushed onto the prepared concrete:

73 parts of Epoxy Resin A
27 parts of crsyl glycidyl ether
25 parts of curing agent A
10 parts of curing agent B Three to four gallon batches of the topping composition were blended mechanically in a six-gallon pail by first thoroughly mixing the epoxy resin and curing agent and then blending in the walnut shell aggregate. The topping was composed of the following ingredients:

80 parts of Epoxy Resin A
20 parts of cresyl glycidyl ether
45.5 parts of curing agent A
4.5 parts of curing agent B
135 parts of walnut shell aggregate—particle size 8-20 mesh
158 parts of walnut shell aggregate—particle size 18-40 mesh
158 parts of walnut shell aggregate—particle size 35-60 mesh The above formulation was then trowelled over the primed concrete in thicknesses varying from 1/8 to 1 inch depending upon the depth of erosion of the concrete surface. The topping was sufficiently cured overnight for foot traffic and after three days was ready for heavy traffic.

This floor was subjected to constant traffic from electric lift trucks having four steel wheels on the rear and one large rubber wheel on the front. Each steel wheel measured 3 inches in width and 3½ inches in diameter. When the trucks are fully loaded, the weight on each wheel is approximately 500 pounds per inch of steel wheel width. After subjection to eight months of such traffic, the topped floor exhibited little or no signs of deterioration.

EXAMPLE II

In order to evaluate and compare various topping formulations, the following apparatus was devised to simulate the passing of heavily loaded steel wheels over the topped concrete:

To a circular steel plate measuring 40 inches in diameter and ¾ inch thick were fastened three steel wheels at a distance of 6 inches from the edge of the plate and positioned symmetrically. The steel wheels were mounted with a ball-bearing swivel plate and measured 5 inches in diameter and 1⅝ inches across the face. In the center of the circular steel plate a $1^{11}/_{15}$ inch diameter steel shaft was connected at right angles to the plate. This shaft extended below the plate and into a bushing which was bolted to the floor. The portion of the shaft that extended above the plate was supported at right angles to the floor by means of a bushing braced to the motor frame. A large sprocket was fastened to the top of the shaft. The sproket was driven by a chain powered by a one horsepower motor geared down to 96 r.p.m. The sproket teeth ratio was selected to rotate the steel wheels at a speed of 15 r.p.m. The weight resting on all three wheels could be varied between 360 and 1500 pounds or 120 to 500 pounds per wheel.

The concrete surface approximately 3 inches on either side of the path of the steel wheels was cleaned and abraded using a compressed air-driven needle gun. The circular path covered by the revolving wheels was divided into equal areas. Oak strip dividers measuring 3/16 inch thick, ¼ inch wide and 7½ inches long were fastened to the concrete to divide off the areas. Each area was primed with a brush coat of the clear binder formulation. About 20 minutes after the prime coat had been applied, the filled toppings were applied to each area and were screened and trowelled smooth. The formulations tested are presented in Table II. The formulations were adjusted to the same percentage of filler by *volume* in order that a fair comparison of the formulas could be made.

The topping formulations were allowed to cure for a period of three weeks at ambient temperature before testing. The test results are given in Table III. This table lists the appearance and depth of erosion caused by the rolling action of the steel wheels under two different loads and after various numbers of passes. The depth of erosion was measured by placing a straight edge across the width of the test patch, at right angles to the path of the wheels, and measuring the space under the straight edge with feeler gauges. Column 1 of Table III compares the results after 5,400 wheel passes with a load of 120 pounds per wheel. The load was then increased to 400 pounds per wheel to accelerate the test. Columns 2 and 3 show the test results after approximately 11,500 and 27,700 passes of the steel wheels.

As can be seen from the test results given in Table III, the formulations containing walnut shells (1 and 2) were much more resistant to wear from steel wheels than formulations using sand and expanded shale.

EXAMPLE III

Using the same procedure as described in Example II, another series of topping formulations was tested.

These formulations were cured for 2.5 weeks before the tests were made. The formulas used are given in Table IV and the results of the tests are listed in Table V. As can be seen from these results, the walnut shell filled toppings exhibited excellent wear resistance to the steel wheeled testing apparatus.

EXAMPLE IV

Various filled epoxy resin formulations were made from blends of epoxy resins, curing agents and fillers. The blends were formed into specimens measuring ½" x ½" x 1" and were cured for a period of two weeks at 77° C. The compressive properties were then determined using an Instron tester.

The formulations and compressive properties are given in the attached Table VI. The compressive yield strengths and ultimate compressive strengths were the same since the yield point occurred at the maximum load. As can be seen from these results, the walnut filled epoxy formulations have much higher compressive strengths than the sand filled systems.

TABLE I.—IDENTIFICATION OF RESINS, CONVERTERS AND FILLERS

Epoxy Resin A—Diglycidyl ether of Bisphenol A' (epoxide equivalent—190)
Epoxy Resin B—Diglycidyl ether of propylene glycol-1,2 (epoxide equivalent—220)
Epoxy Resin C—Glycidyl polyether of castor oil (epoxide equivalent—619)
Reactive Diluent A—Glycidyl ether of mixed $C_8$–$C_{10}$ alcohols (epoxide equivalent—240)
Curing Agent A—Aliphatic amidoamine from tetraethylene pentamine and tall oil acids having a viscosity at 25° C. of 350 cps. and an equivalent weight of 90.
Curing Agent B—Aliphatic amine adduct of diethylene triamine with Epoxy Resin A having a viscosity at 25° C. of 4500 cps. and an equivalent weight of 38.
Walnut Shell 2.5 (Specific gravity—1.33):
  Particle size distribution—

| | Weight percent |
|---|---|
| 8 mesh | 0–5 |
| 12 mesh | 74–100 |
| 20 mesh | 0–20 |

Walnut Shell 6 (Specific gravity—1.33):
  Particle size distribution—

| | Weight percent |
|---|---|
| 20 mesh | 0–4 |
| 40 mesh | 85–100 |
| 60 mesh | 0–10 |

Walnut Shell 7 (Specific gravity—1.33):
  Particle size distribution—

| | Weight percent |
|---|---|
| 35 mesh | 0–5 |
| 60 mesh | 80–100 |
| 100 mesh | 0–13 |

2 Q Rok Sand (Specific gravity—2.65):
  Particle size distribution—

| | Weight percent |
|---|---|
| 20 mesh | 4.6 |
| 30 mesh | 61.8 |
| 40 mesh | 26.6 |
| 50 mesh | 5.7 |
| 100 mesh | 0.5 |

Ohio River Sand (Specific gravity—2.65):
  Particle size distribution—

| | Weight percent |
|---|---|
| 8 mesh | 2.5 |
| 16 mesh | 5 |
| 30 mesh | 17.5 |
| 50 mesh | 64 |
| 100 mesh | 11 |

Flintshot Sand (Specific gravity):
  Particle size distribution—

| | Weight percent |
|---|---|
| 40 mesh | 92 |

Expanded Shale (Specific gravity—0.96):
  Particle size distribution—

| | Weight percent |
|---|---|
| 16 mesh | 34 |
| 30 mesh | 22 |
| 50 mesh | 16 |
| 100 mesh | 12 |

TABLE II.—COMPOSITION OF TOPPING FORMULATIONS

| Formula | 1 | 2 | 3 | 4 | 5 | 6 | 7 |
|---|---|---|---|---|---|---|---|
| Resin Portion: | | | | | | | |
| Epoxy Resin A | 80 | 80 | 80 | 80 | 80 | 80 | 89 |
| Cresyl Glycidyl Ether | 20 | | | 20 | 20 | 20 | 20 | |
| Versatic Acid Glycidyl Ester | | 20 | | | | | 20 |
| Converter Portion: | | | | | | | |
| Curing Agent A | 45.5 | 43.6 | 45.5 | 45.5 | 45.5 | 45.5 | 43.6 |
| Curing Agent B | 4.5 | 4.4 | 4.5 | 4.5 | 4.5 | 4.5 | 4.4 |
| Filler Portion: | | | | | | | |
| Walnut Shell 2.5 | 225.5 | | 225 | | | | |
| Walnut Shell 6 | 112.75 | 112.75 | | | | | |
| Walnut Shell 7 | 112.75 | 112.5 | | | | | |
| #2 Q Rok Sand | | | | 900 | | | |
| Flintshot Sand | | | | | 900 | | |
| Ohio River Sand | | | | | | 900 | 888 |
| Expanded Shale | | | | | | 328 | |
| Percent Filler by Volume | 71 | 71 | 71 | 71 | 71 | 71 | 71 |

TABLE III.—TESTING OF TOPPING COMPOSITION UNDER STEEL WHEELS

| Formulation No. | 5,400 Wheel Passes, 120 lbs./wheel load | 11,475 Wheel Passes, 400 lbs./wheel load | | 27,675 Wheel Passes, 400 lbs./wheel load | |
|---|---|---|---|---|---|
| | | Appearance | Depth of Erosion (Mils) | Appearance | Depth of Erosion (Mils) |
| 1 | O.K. | Slightly eroded | 9 | Slightly eroded, one or two chips | 9 |
| 2 | O.K. | do | 11 | Slightly eroded, some chips | 17 |
| 3 | Badly eroded | Very badly eroded | 90 | Very badly eroded and chipped | 94 |
| 4 | Slightly eroded | Badly eroded and chipped | 39 | Badly eroded and chipped | 55 |
| 5 | do | do | 51 | Very badly eroded and chipped | 90 |
| 6 | O.K. | Eroded | 33 | Badly eroded and chipped | 50 |
| 7 | Slightly eroded | Badly eroded and chipped | 66 | Very badly eroded and chipped | 129 |

TABLE IV.—COMPOSITION OF TOPPING FORMULATIONS

| Formula | 1 | 2 | 3 | 4 | 5 | 6 | 7 | 8 | 9 | 10 | 11 |
|---|---|---|---|---|---|---|---|---|---|---|---|
| Resin Portion: | | | | | | | | | | | |
| Epoxy Resin A | 80 | 80 | 80 | 80 | 80 | 73 | 73 | 65 | 65 | 86 | |
| Epoxy Resin B | | | | | | | | 35 | 35 | | |
| Cresyl Glycidyl Ether | 20 | 20 | 20 | 20 | 20 | 27 | 27 | | | | |
| Reactive Diluent A | | | | | | | | | | 14 | 14 |
| Converter Portion: | | | | | | | | | | | |
| Curing Agent A | 45.5 | 45.5 | 45.5 | 45.5 | 45.5 | 25 | 25 | 24.3 | 24.3 | 24.3 | 24.3 |
| Curing Agent B | 4.5 | 4.5 | 4.5 | 4.5 | 4.5 | 10 | 10 | 9.7 | 9.7 | 9.7 | 9.7 |
| Filler Portion: | | | | | | | | | | | |
| Walnut Shell 2.5 | 135 | | | 175 | 276 | 203 | | 202 | 202 | | |
| Walnut Shell 6 | 158 | | 226 | 88 | 138 | 101 | | 101 | | 101 | |
| Walnut Shell 7 | 158 | | 226 | 88 | 138 | 101 | | 101 | | 101 | |
| Ohio River Sand | | 900 | | | | | 810 | | 810 | | 810 |

TABLE V.—TESTING OF TOPPING COMPOSITIONS UNDER STEEL WHEELS

| | 13,500 Wheel Passes—400 Lbs./Wheel Load | | 27,000 Wheel Passes—400 Lbs./Wheel Load | | 43,875 Wheel Passes—400 Lbs./Wheel Load | |
|---|---|---|---|---|---|---|
| Formulation Number | Appearance | Depth of Erosion (Mils) | Appearance | Depth of Erosion (Mils) | Appearance | Depth of Erosion (Mils) |
| 1 | O.K. | 5 | O.K. | 8 | O.K. | 9 |
| 2 | Some chipping | 43 | Badly chipped | 79 | Badly chipped | 87 |
| 3 | O.K. | 12 | O.K. | 15 | O.K. | 16 |
| 4 | O.K. | 8 | O.K. | 12 | O.K. | 12 |
| 5 | O.K. | 9 | O.K. | 12 | O.K. | 12 |
| 6 | O.K. | 8 | O.K. | 9 | O.K. | 12 |
| 7 | O.K. | 12 | O.K. | 15 | A few chips | 20 |
| 8 | O.K. | 8 | O.K. | 11 | O.K. | 13 |
| 9 | A few chips | 13 | Chipped | 21 | Badly chipped | 45 |
| 10 | O.K. | 11 | O.K. | 14 | O.K. | 15 |
| 11 | Badly chipped | 41 | Very badly chipped | 94 | Very badly chipped | 105 |

TABLE VI—COMPRESSIVE STRENGTH PROPERTIES

| Formula | 1 | 2 | 3 | 4 |
|---|---|---|---|---|
| Resin Portion: | | | | |
| Epoxy Resin A | 80 | 80 | 65 | 65 |
| Epoxy Resin C | | | 35 | 35 |
| Cresyl Glycidyl Ether | 20 | 20 | | |
| Converter Portion: | | | | |
| Curing Agent A | 45.5 | 45.5 | 20 | 20 |
| Curing Agent B | 4.5 | 4.5 | 8 | 8 |
| Filler Portion: | | | | |
| Walnut Shell 2.5 | 135 | | | 72 |
| Walnut Shell 6 | 158 | | | 83 |
| Walnut Shell 7 | 158 | | | 83 |
| Ohio River Sand | | 900 | 775 | |
| Ultimate Compressive Strength (p.s.i.) | 4,280 | 1,875 | 2,441 | 4,061 |
| Compressive Yield Strength (p.s.i.) | 4,280 | 1,875 | 2,441 | 4,061 |
| Initial Compressive Modulus (p.s.i.×$10^6$) | 0.05 | 0.03 | 0.06 | 0.05 |
| Deflection (inch) | 0.12 | 0.09 | 0.08 | 0.14 |

It is to be understood that the foregoing detailed description is given merely by way of illustration and that many variations may be made therein without departing from the spirit of the invention.

The embodiments of the invention in which an exclusive property or privilege is claimed are defined as follows:

1. A protective floor topping composition resistant to wear from steel wheeled vehicles (when cured) which consists esesntially of a curable blend of (a) an epoxy resin having more than one 1,2-epoxy group per molecule, (b) an epoxy resin curing agent and (c) walnut shell aggregate having a particle size of about 0.0017 inch to about 0.125 inch in diameter wherein the composition contains 20 to 90 weight percent walnut shell aggregate based on the total weight of (a), (b) and (c).

2. The composition of claim 1 wherein the epoxy resin is a glycidyl polyether of a polyhydric phenol or polyhydric alcohol, wherein the epoxy resin curing agent is an aliphatic amine or mercaptan containing a plurality of active hydrogens and wherein the walnut shell aggregate has a particle size of about 0.0029 inch to about 0.093 inch in diameter.

3. The composition of claim 2 wherein the epoxy resin is the diglycidyl ether of p,p'-dihydroxydiphenyl propane having an epoxide equivalent weight of 180 to 250, the curing agent is an amido-amine curing agent and the walnut shell aggregate is present in the amount of 60 to 80 weight percent based on the total composition.

4. The composition of claim 3 wherein 5 to 25 weight percent of the total weight of epoxy resin is a monoglycidyl ether of a monohydric phenol or monohydric alcohol.

5. A floor highly resistant to wear from steel wheeled vehicles which is consists essentially of a concrete supporting base and a tightly adhering coating, said coating being a cured blend of an epoxy resin having more than one 1,2-epoxy group per molecule, an epoxy resin curing agent and 20 to 90 weight percent, based on the total weight of the coating, of walnut shell aggregate having a particle size of about 0.017 inch to about 0.125 inch in diameter.

6. A method for improving the wear resistance of floors which are subjected to heavy compressive loads which consists essentially of (1) applying to the floor a curable blend of an epoxy resin having more than one 1,2-epoxy group per molecule, an epoxy resin curing agent and 20 to 90 weight percent, based on the total weight of the blend, of walnut shell aggregate having a particle size of about 0.0017 inch to about 0.125 inch in diameter, (2) troweling the blend to a smooth surface and (3) curing the blend at a temperature of 0° F. to 150° F. to a tough, wear-resistant thermoset composition.

7. The method of claim 6 wherein the floor is first primed with an aggregate free blend of epoxy resin and curing agent and before the blend has cured, the blend of epoxy resin, curing agent and walnut shell aggregate is applied.

8. The method of claim 6 wherein the epoxy resin is a glycidyl polyether of a polyhydric phenol or polyhydric alcohol, the epoxy resin curing agent is an aliphatic amine, acid accelerated aromatic amine or mercaptan containing a plurality of active hydrogens and wherein the walnut shell aggregate has a particle size of about 0.0029 inch to about 0.093 inch in diameter.

9. The method of claim 6 wherein the epoxy resin is the diglycidyl ether of p,p'-dihydroxydiphenyl propane having an expoxide equivalent weight of 180 to 250, the curing agent is an amido-amine curing agent and the walnut shell aggregate has a particle size of about 0.029 inch to about 0.093 inch in diameter.

10. The method of claim 9 wherein the curing temperature is about 60° F. to about 100° F.

References Cited
UNITED STATES PATENTS

| | | | |
|---|---|---|---|
| 2,461,900 | 2/1949 | Johnson | 260—17.3 |
| 2,507,465 | 5/1950 | Ayers | 260—17.3 |
| 2,682,517 | 6/1954 | Asaff. | |
| 2,805,448 | 9/1957 | Rubenstein | 52—309 |
| 2,894,920 | 7/1959 | Ramos | 260—9 |
| 3,203,913 | 8/1965 | Finelli | 260—9 |
| 3,304,344 | 2/1967 | Szawlowski | 260—9 |
| 3,314,205 | 4/1967 | Davis | 260—9 |

WILLIAM H. SHORT, Primary Examiner

E. WOODBERRY, Assistant Examiner

U.S. Cl. X.R.

94—3; 106—288; 260—9